US007346905B2

(12) United States Patent
Dorrance et al.

(10) Patent No.: US 7,346,905 B2
(45) Date of Patent: Mar. 18, 2008

(54) APPARATUS AND METHOD FOR MAINTAINING RESOURCE INTEGRITY WITHOUT A UNIFIED TRANSACTION MANAGER IN A SOFTWARE ENVIRONMENT

(75) Inventors: Daniel Michael Dorrance, Round Rock, TX (US); Ricardo N. Olivieri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 10/457,843

(22) Filed: Jun. 10, 2003

(65) Prior Publication Data

US 2004/0255298 A1 Dec. 16, 2004

(51) Int. Cl.
- *G06F 9/46* (2006.01)
- *G06F 11/00* (2006.01)
- *G06F 12/00* (2006.01)
- *G06F 15/173* (2006.01)

(52) U.S. Cl. .................. 718/104; 719/328; 719/329; 714/15; 714/16; 707/201; 707/202; 709/223; 709/226

(58) Field of Classification Search ........ 718/100–108; 719/328–329; 707/201–202; 709/223–226; 717/15–16

See application file for complete search history.

(56) References Cited

U.S. PATENT DOCUMENTS

| 4,363,093 | A | * | 12/1982 | Davis et al. ................. 709/227 |
| 5,890,161 | A | | 3/1999 | Helland et al. ............. 707/103 |
| 5,916,307 | A | * | 6/1999 | Piskiel et al. ............... 719/314 |
| 6,141,679 | A | | 10/2000 | Schaefer et al. ............ 709/201 |
| 6,233,585 | B1 | | 5/2001 | Gupta et al. ................. 707/103 |
| 6,272,675 | B1 | | 8/2001 | Schrab et al. ................. 717/2 |
| 6,275,843 | B1 | | 8/2001 | Chorn ........................ 709/101 |
| 6,298,478 | B1 | | 10/2001 | Nally et al. ..................... 717/6 |
| 6,317,773 | B1 | | 11/2001 | Cobb et al. ................. 709/101 |
| 6,334,193 | B1 | * | 12/2001 | Buzsaki ........................ 714/2 |

(Continued)

FOREIGN PATENT DOCUMENTS

EP  0 457 111 A2  11/1991

(Continued)

OTHER PUBLICATIONS

William Crawford and Jim Farley, An Introduction to JDBC, Part 3, http://web.archive.org/web/20021010011715/www.onjava.com/pub/a/onjava/excerpt/javaentnut_2/index3.html.*

*Primary Examiner*—Meng-Al T. An
*Assistant Examiner*—Jennifer N. To
(74) *Attorney, Agent, or Firm*—Duke W. Yee; Herman Rodriguez; Wayne P. Bailey (57) ABSTRACT

An apparatus and method for maintaining integrity of data in a software environment are provided. With the apparatus and method, the individual software resources associated with a transaction are identified and the processing of these resources is started. As the processing of these resources terminates, their associated APIs return messages indicating either that the software resource committed or was unable to commit and the reason why the software resource was unable to commit. Based on this reason, appropriate error resolution and recovery operations are performed and the transaction is resubmitted only to those software resources that were unable to commit. The software resources that already committed have their states maintained. In this way, roll back of committed software resources is avoided.

8 Claims, 4 Drawing Sheets

U.S. PATENT DOCUMENTS

| | | | |
|---|---|---|---|
| 6,360,228 B1 | 3/2002 | Sundara et al. | 707/102 |
| 6,363,401 B2* | 3/2002 | Yahya et al. | 707/202 |
| 6,374,243 B1* | 4/2002 | Kobayashi et al. | 707/8 |
| 6,490,595 B1 | 12/2002 | Candee et al. | 707/202 |
| 2002/0013846 A1 | 1/2002 | Vuong et al. | 709/226 |
| 2002/0099862 A1 | 7/2002 | Mikalsen et al. | 709/310 |
| 2002/0161840 A1 | 10/2002 | Willcox et al. | 709/206 |
| 2002/0194242 A1* | 12/2002 | Chandrasekaran et al. | 709/101 |
| 2002/0194244 A1 | 12/2002 | Raventos | 709/101 |

FOREIGN PATENT DOCUMENTS

| | | |
|---|---|---|
| EP | 1 308 839 A2 | 5/2003 |
| EP | 1308839 A2 | 5/2003 |
| JP | 0464146 | 2/1992 |
| JP | 06259397 | 9/1994 |
| JP | 07262073 | 10/1995 |
| JP | 09204341 | 8/2007 |

* cited by examiner

APPARATUS AND METHOD FOR MAINTAINING RESOURCE INTEGRITY WITHOUT A UNIFIED TRANSACTION MANAGER IN A SOFTWARE ENVIRONMENT

BACKGROUND OF THE INVENTION

1. Technical Field

The present invention is generally directed to an improved computing system. More specifically, the present invention is directed to a resource integrity engine that maintains the integrity of data in the computing system when handling transactions involving multiple software resources.

2. Description of Related Art

With the exception of very trivial applications, it is common for application programs executing in today's software environments to interact with multiple software resources in order to accomplish a specified task. Many times these software resources are basically independent of each other but together need to act as an atomic unit, i.e. an unbreakable whole, during the execution of the application program. This unit of execution, having multiple resources acting in concert as an atomic unit, is referred to as a transaction.

For example, a single task may require a database software resource to perform an update of a record in the database and require a messaging software resource to send a message to another software resource indicating completion of the update. The transaction would be comprised of the updating of the database record and the sending of the message. Both of these operations must be performed in order for the transaction to complete successfully.

Certain software operating systems provide a mechanism for executing collaboration between the individual resources. This mechanism is often referred to as a transaction manager. Such a mechanism creates a single context that acts as the single atomic unit for each transactional operation that is distributed among the individual resources. One well known technique for managing transactions in a transaction manager of this type is to use a two phase commit process.

The two phase commit process involves a "prepare phase" and a "commit phase." During the "prepare phase," the transaction manager informs all of the participants of the intended transaction and requests that they acknowledge that they are prepared to either commit or rollback the pending transaction. During the "commit phase," all of the participants in the transaction are asked to commit the transaction, i.e. complete their portion of the transaction. If a participant is unable to commit the transaction or does not respond during the "prepare phase," then the transaction fails and any changes are rolled back. The rollback of changes made by a transaction that has not been completed by all of the participants is intended to maintain integrity of the data in the system. That is, a synchronization of the states of the software resources involved in the transaction must be maintained.

The transaction manager provides this functionality transparent to the application program. While this is a perfectly acceptable approach when the managed software resources are supported by the computing system software, not all different software resource types are necessarily supported by every transaction manager. Furthermore, not all software environments include a transaction manager that may be used to manage transactions through, for example, a two phase commit process.

Thus, it would be beneficial to have an apparatus and method for maintaining the integrity of data in a computing system where a transaction manager is not present or where certain software resources are not supported by the transaction manager that may be present in the computing system.

SUMMARY OF THE INVENTION

The present invention provides an apparatus and method for maintaining resource integrity in a software environment without a transaction manager. With the apparatus and method of the present invention, a resource integrity engine is provided for interfacing with an application program and a plurality of software resource application program interfaces (APIs). The resource integrity engine receives a transaction from the application program that identifies a plurality of software resources that are involved in the transaction. The resource integrity engine identifies the appropriate API, which is registered with the operating system, for the software resources identified in the transaction and sends a request to the software resources via the APIs to ask that they respond with an acknowledgement that they are ready to receive the transaction.

Upon receiving an acknowledgement from the software resources, the resource integrity engine transmits the transaction to the software resources, e.g., database, communication channel, queue, messaging software, or the like, causing them to perform the requisite functionality indicated in the transaction, i.e. commit, or fail to commit. A software resource may fail to commit for many different reasons including, for example, communication connections failing, database connections that become stale, a resource manager failing, a queue being full, timeout conditions being met, a maximum number of possible connections being reached, a hardware failure, such as a disk drive, system memory exhausted, or the like.

With the present invention, a recognition engine of the resource integrity engine receives messages back from the APIs associated with the software resources indicating whether the respective software resources were successfully committed or that the commit failed. The recognition engine employs logic to determine if all of the software resources were successfully committed, if none of the software resources were successfully committed, or if there was a partial commit of the transaction.

If all of the software resources identified as being part of the transaction are successfully committed, i.e. the transaction functions associated with the software resource are performed successfully, then the transaction completes without an error. If, however, one or more of the software resources associated with the transaction fails to commit, then the recognition engine determines if and how to resubmit the remainder of the transaction associated with the software resources that failed to commit. This is contrary to the known two-phase commit operations which rollback changes when even one resource fails to commit.

In the case where none of the software resources associated with the transaction successfully committed, the transaction may be resubmitted as a whole to the software resources since the previous submission did not result in a change of state for any of the software resources. However, without error recovery, the resubmission of the portions of the transaction that failed may not result in a successful commit of the software resources. Therefore, the recognition engine analyzes the response messages received from the APIs to determine the reason why the software resources were unable to commit in the previous submission of the transaction. Based on the determined reason, the recognition engine invokes either appropriate error recovery, or other appropriate continuation logic, in order to increase the likelihood that a resubmission of the transaction will result in a successful commit of all of the software resources.

In the case of a partial commit of the software resources associated with the transaction, the recognition engine employs logic for maintaining the data integrity of software resources that have already committed while resubmitting the portions of the transaction that failed to the software resources that did not commit. In this case, the recognition engine identifies which software resources have been committed and which ones have not. Only those software resources that were not successfully committed are resubmitted as part of the transactional process in order to avoid duplication of data that could cause an error condition within the transaction.

The logic for resubmission is similar to that discussed above with regard to the case where none of the software resources committed. That is, the messages returned by the APIs of the software resources are analyzed by the recognition engine to determine if the software resources successfully committed or if there was an error encountered by one or more of the software resources. In one embodiment, information that is inherent to the transaction is used to determine whether a resource has been committed or not. For instance, a transaction could have a unique identification number. If this unique identifier is found within the resource, then the recognition engine can conclude that the resource was committed. In this way, the software program is able to keep the state of each software resource without explicitly tracking the integrity of the data. Note that in order for the recognition engine to query a resource, the resource entity must be retrievable via the resource's API or other register mechanisms.

The recognition engine of the resource integrity engine may then apply one or more recovery and resubmission rules to the non-committed entries in the data structure. These rules may include correlating the error code to a proper procedure for resubmitting the transaction to an associated software resource. The rules may look at the error codes returned and the context in which the error code was returned. For example, if the error code indicates that a communication connection with an outbound queue has failed, then the resubmission procedure identified through the rules may be to wait a predetermined period and then resubmit the transaction to the outbound queue.

Software resources which committed successfully do not have their changes rolled back. A feature of the invention is the fact that the present invention does not rollback "committed" resources. It "detects" that situation and resubmits the uncommitted resource immediately upon detection. Eventually if resubmission ultimately fails, then the entire transaction is sent to an Error Handler for Problem Determination and Correction. So while the invention does not enact rollbacks, an explicit indication is provided to indicate the transaction is not completed. The rationale is for most cases resubmission will succeed. In the rare case that resubmission does not succeed, the resource at risk is identified and sent to the Error Handling Mechanism. That mechanism may in fact do any number of things including a rollback.

Thus, with the present invention, a mechanism is provided for handling transactions in a software environment that does not have a transaction manager. Moreover, the present invention provides a mechanism in which portions of a transaction may be resubmitted to the operating system of those software resources that were unable to commit in order to complete the transaction and avoid rolling back the changes made to committed software resources. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for managing transactions in a software environment that does not include a transaction manager. Moreover, the present invention provides a mechanism for resubmitting a transaction to software resources associated with the transaction that were unable to commit in a previous submission of the transaction. The mechanisms of the present invention may be implemented in a stand-alone computing device or a distributed data processing environment without departing from the spirit and scope of the present invention. In a preferred embodiment, the present invention is implemented in a server computing device of a distributed data processing system. Therefore, the FIGS. 1-3 are provided hereafter in order to give a context for the discussion of the features and advantages of the present invention.

Figure 1:
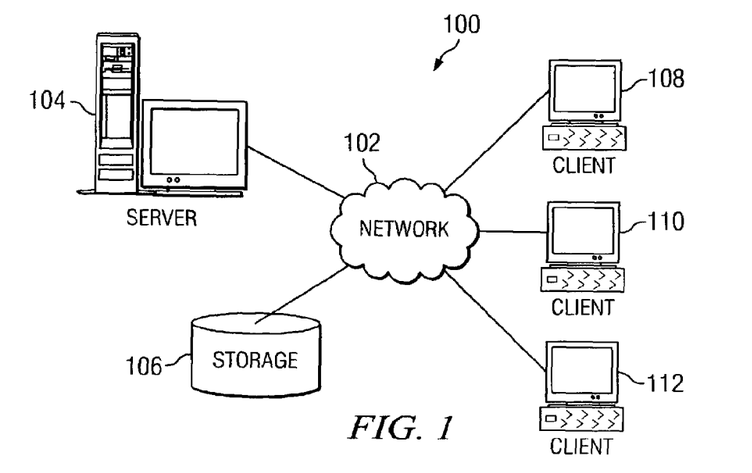
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
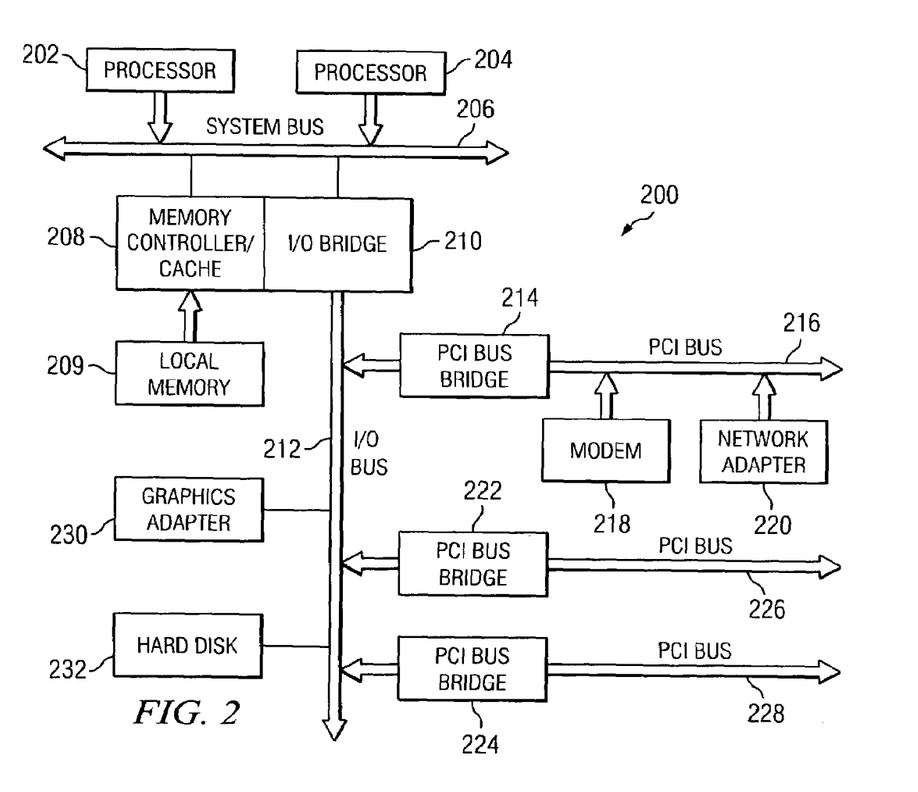
FIG. 2 is an exemplary diagram illustrating a server computing device in which the present invention may be implemented.
Figure 3:
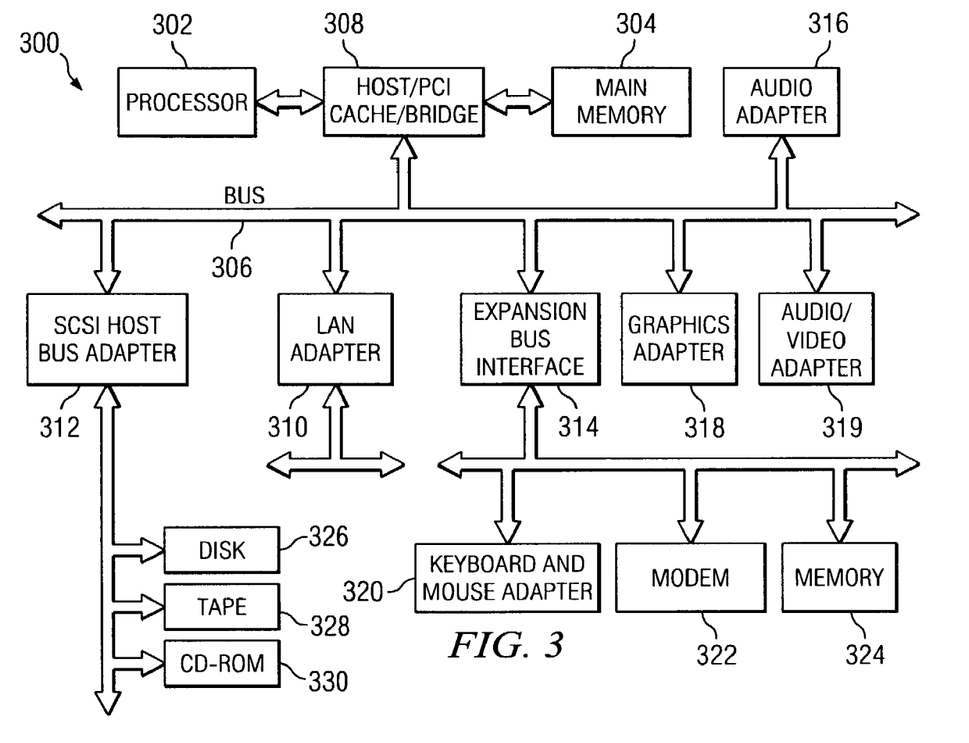
FIG. 3 is an exemplary diagram illustrating a client or stand alone computing device in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer or a stand-alone computing device. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned, the present invention provides an apparatus and method for maintaining resource integrity in a software environment without a transaction manager. The present invention provides a resource integrity engine that ensures the integrity of the data of the computing system while providing for the resubmission of a transaction to software resources in partially committed transactions.

Figure 4:
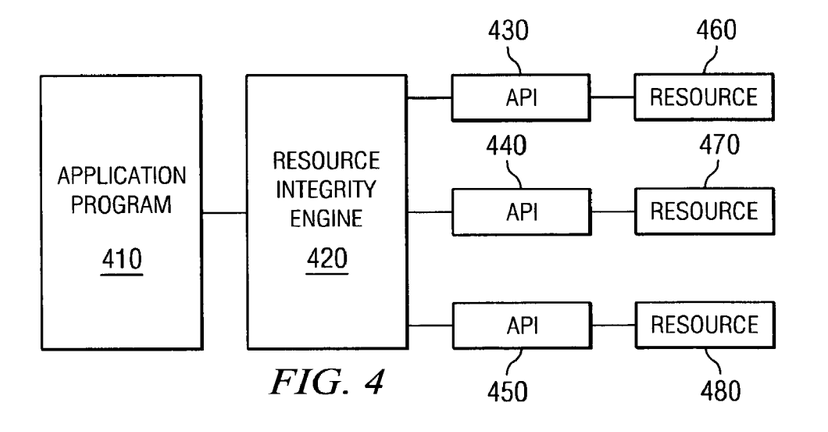
FIG. 4 is an exemplary block diagram illustrating the relationship of the primary operational components of the present invention.

With reference now to FIG. 4, a resource integrity engine 420 is provided for interfacing with an application program 410 and a plurality of software resource application program interfaces (APIs) 430-450 associated with a plurality of software resources 460-480. The application program 410, resource integrity engine 420, APIs 430-450 and software resource 460-480 may be resident on the same or different computing devices. For example, the application program 410 may be resident on a client computing device while the resource integrity engine 420, APIs 430-450 and software resources 460-480 are resident on a server computing device.

The application program 410 submits a transaction for processing to the resource integrity engine 420 that identifies a plurality of software resources 460-480 involved in the transaction. The resource integrity engine 420 identifies the software resources 460-480 that are part of the transaction and their respective APIs 430-450. The resource integrity engine 420 then submits the transaction to the identified software resources 460-480 via their APIs 430-450. These APIs 430-450 provide indications as to whether their corresponding software resources 460-480 successfully or unsuccessfully performed their part of a transaction.

For example, the transaction may take the form of placing a database update message on an inbound queue, applying business rules to the update message to thereby update a database, and then setting an update complete message on an outbound queue. From this transaction, it is clear that two resources are being used—the messaging middleware resource and the database software resource. APIs for these two resources are presumed to have been registered with the operating system and can be invoked by the resource integrity engine 420 via the operating system in a known manner such that the success/error codes returned by the APIs may be checked by the resource integrity engine 420.

The primary function of the resource integrity engine 420 is to maintain integrity of the data managed by the software resources 460-480. In order to maintain integrity, the resource integrity engine 420 is required to keep the software resources 460-480 synchronized among each other. This means that the individual software resources 460-480 are kept current relative to the transaction being executed. If at least one of the software resources 460-480 is not committed, a condition exists where the software resources 460-480 are not synchronized with any other software resource 460-480 taking part in the transaction.

In order to process transactions such that the transaction operates as an atomic unit with regard to the software resources, and maintain the integrity of the data managed by the software resources such that the software resources are synchronized, the present invention performs the following five functions:

(1) identification of the independent software resources involved in the transaction;

(2) verification of the successful commit on software resources;

(3) determination if all software resources of the transaction were successfully committed;

(4) recognition of software resources that did not commit and the reasons why they did not commit; and (5) error recovery and resubmission of the transaction to software resources that did not commit based on the recognized reasons for the software resource having not committed.

As previously mentioned, the resource integrity engine 420 receives a transaction that identifies the software resources that are involved in the transaction. From this information in the transaction, the resource integrity engine 420 may identify associated APIs 430-450 through their registration with the operating system of the computing device in which the present invention is operating. Moreover, the APIs 430-450 provide an interface through which the resource integrity engine 420 is informed of either the successful or unsuccessful completion of its thread of execution of the transaction by the associated software resources 460-480, i.e. whether the software resource committed the transaction or not. Thus, the interaction with the APIs 430-450 of the software resources 460-480 provide the ability for the resource integrity engine 420 to perform functions (1) and (2) above, i.e. the identification of independent software resources and the ability to verify the successful commit of software resources.

The resource integrity engine 420, upon receiving a transaction from an application program 410, identifies the appropriate APIs 430-450 of the software resources 460-480 that are part of the transaction. The resource integrity engine 420 also initializes a data structure for maintaining context state information about the transaction. The resource integrity engine 420 then sends the transaction to the identified software resources 460-480 via their respective APIs 430-450. The resource integrity engine 420 then awaits a response from the APIs 430-450 indicating either a successful commit of the software resource or an error condition with regard to the software resource. The successful commit or the error condition is then recorded in the data structure associated with the transaction.

Transactions may be performed in many different ways depending on the particular implementation of the computing system. For example, in one particular implementation, processing may be based on a set of software instructions that entail a sequential flow of execution such that when an individual software resource is successfully committed, processing flows to the next independent software resources that is to partake in the transaction. In another exemplary implementation, event notification logic may be utilized. For example, when an individual software resource commits, the program committing the resource would notify the resource integrity engine that the action had completed successfully. Part of the information supplied is the status indication of success or failure of the resource.

The preferred embodiments of the present invention are being described in terms of the event notification implementation described above. However, it should be appreciated that the sequential processing flow may be used as well. In such a case, the context state data structure maintained by the resource integrity engine 420 may include information about the serialization of the software resources and whether they returned a successful commit or not. If a software resource returns an error condition, any software resource appearing in the serialization after the software resource that returned an error will not have an entry for their current state since they require the successful commit of the software resource that returned the error.

In either case, the resource integrity engine 420 may look at the state information in the context state data structure for the transaction to determine if all of the software resources of the transaction committed the transaction (function 3 above). The resource integrity engine 420 employs a recognition engine to discriminate between the possible cases that result from the transaction being submitted to the software resources 460-480 (function 4 above) If any of the software resources listed in the context state data structure returned an error condition, then the transaction did not complete successfully and a recovery and resubmission of the transaction is in order. If all of the software resources listed in the context state data structure returned a successful commit, then the transaction completed successfully, and normal processing of a successful transaction is performed. By "normal processing" what is meant is that the transaction produced the desired action, such as successfully recording patient information in a database and transmitting that information to another system, a banking deposit was recorded properly, an airline reservation was successfully booked, etc., and processing specific to the implementation is then carried out.

For example, assumed that a patient message is received which contains information that gets written into a database record. This information includes a unique ID contained in the message. Additionally, once the database is updated, the message content is also delivered to another messaging system. If a problem occurs between the database update and the sending of the message onto the next system, data may be out of sync. If the message added a patient in the first system and the first system now gets an update for that patient, it can appropriately update the record. However, if the update is sent to the next messaging system it would fail since the initial record was never received.

Without the present invention when the initial message was requeued for processing on the first system (since it was never committed by the messaging system but was only committed on the database system), an error was returned indicating duplication of a record in the database. That would terminate processing of that transaction in known systems.

With the present invention, the recognition engine determines that the identifier in the database matches the identifier in the message and allows subsequent processing to take place, namely sending the message onto the next system.

In the case where no software resources were successfully committed, then the entire set of collaborative operations in the transaction can essentially be repeated. In a practical sense, this implies that the initial software resource failed and processing of the subsequent software resources should be abandoned. However, unless an error resolution and recovery operation is applied, there is no guarantee that repeating the operations will result in a successful commit of the software resources. The particular error resolution and recovery operations performed is based on the type of error encountered by the software resource when trying to commit the transaction.

For example, the recognition engine of the resource integrity engine 420 may apply recognition rules against the error indicators returned by the APIs 430-450 associated with the software resources 460-480, and stored in the context state data structure, to determine the type of error resolution and recovery operations to be performed prior to resubmission of the transaction. Such error resolution and recovery operations may involve the initiating of another software operation to actively resolve the error and recover the software resource or may be a passive resolution and recovery, such as waiting a predetermined period of time prior to resubmitting the transaction to the software resource. Once the appropriate error resolution and recovery operations are performed, the resource integrity engine 420 may resubmit the transaction to the software resources 460-480 via their APIs 430-450 (function 5 above).

In the case where some software resources committed, but others did not, the resource integrity engine 420 ensures overall data integrity while being able to resubmit the transaction to only those software resources that did not commit. In this way, duplication of data that may lead to an actual error condition within the transaction causing the transaction to not be able to be completed at all, is avoided.

In the partial commit case, the recognition engine of the resource integrity engine 420 determines, for each software resource in the context state data structure of the transaction, whether the software resource is already committed, if the software resource has an associated error condition noted, or if the software resource is essentially being processed for the first time. If the software resource is already committed, the changes made to the data by the software resource are not rolled back. Instead, the current state of the data changes made by the software resource are maintained.

If the software resource has an associated error condition, appropriate error resolution and recovery operations are performed, based on the identification of the error, and the transaction is resubmitted to only those software resources with error conditions. Once all of the software resources indicate that they have committed the transaction, then normal processing is performed to complete the transaction in the system. If some of the software resources continue to return error conditions, the error resolution and resubmission logic of the present invention may be continued either until all software resources commit or until a predetermined number of resubmissions is made. If after the predetermined number of resubmissions is made there is still one or more software resources that have not committed, it may be determined that the transaction cannot be completed successfully, and the changes made by the other software resources may be rolled back.

Thus, the present invention provides a mechanism for managing transactions in a software environment where there is no transaction manager present. Furthermore, the present invention provides a mechanism for monitoring the software resources associated with a transaction such that software resources that do not commit may have the transaction resubmitted after appropriate error resolution and recovery operations are performed. With the present invention, only software resources that did not commit will have the transaction resubmitted, those that did commit will not have their state changed.

Figure 5:
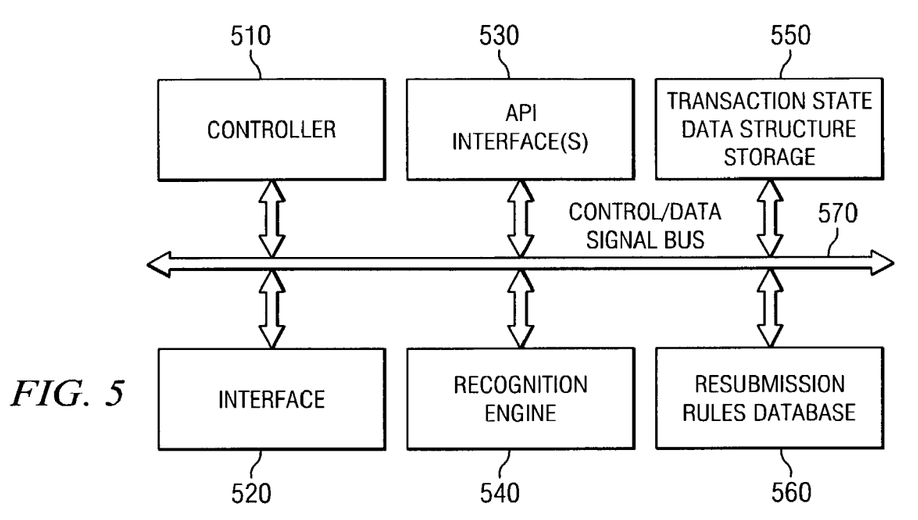
FIG. 5 is an exemplary block diagram of a resource integrity engine in accordance with one exemplary embodiment of the present invention.

FIG. 5 is an exemplary block diagram of a resource integrity engine in accordance with the present invention. The elements in FIG. 5 may be implemented in software, hardware, or any combination of software and hardware. In a preferred embodiment, the elements of FIG. 5 are implemented as software instructions executed by one or more processing devices.

As shown in FIG. 5, the resource integrity engine includes a controller 510, an interface 520, one or more APT interfaces 530, a recognition engine 540, a transaction state data structure storage 550, and an error resolution and recovery/resubmission rules database 560 (hereafter referred to as the "rules database"). The elements 510-560 are in communication with one another via the control/data signal bus 570. Although a bus architecture is shown in FIG. 5, the present invention is not limited to such and any architecture that facilitates the communication of control information and data between the elements 510-560 may be used without departing from the spirit and scope of the present invention.

The controller 510 controls the overall operation of the resource integrity engine and orchestrates the operation of the other elements 520-560. The interface 520 provides a communication pathway to one or more application programs. The API interfaces 530 provides a communication pathway with the APIs of software resources with which the resource integrity engine operates. The controller 510 receives transactions via the interface 520 and sends transaction messages to the software resources via their APIs via the API interfaces 530. The APIs, in turn, return messages indicating either the successful commit of the software resource or an error condition. The state of these software resources returned by the APIs is stored by the controller 510 in a transaction state data structure in the transaction state data structure storage 550.

The recognition engine 540 performs the functions described above with regard to discriminating between cases where all of the software resources committed, none of the software resources committed, and a partial commit of the software resources involved in the transaction. The recognition engine 540 further identifies which software resources committed and which did not based on the transaction state data stored in the transaction state data structure storage 550. The recognition engine 540 may then apply rules from the rules database 560 to determine proper error resolution and recovery operations to be performed on the software resources as well as how and when to resubmit the transaction to the software resources.

With the mechanism shown in FIG. 5, transactions may be submitted to software resources in a software environment where a transaction manager is not present. Moreover, with the mechanism of FIG. 5, the transaction may be resubmitted to software resources that did not commit while maintaining the state of software resources that did commit. Thus, the present invention avoids having to roll back changes made by software resources that did commit so that the entire transaction may be resent.

Figure 6:
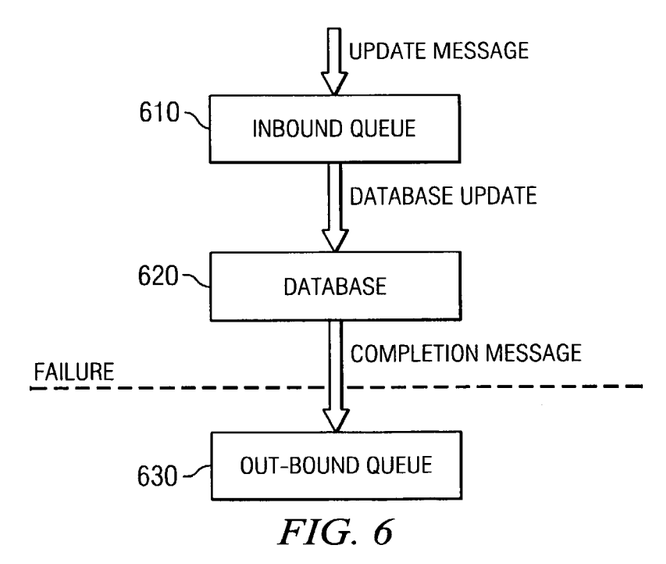
FIG. 6 is an exemplary diagram illustrating an example operation of the present invention.

FIG. 6 provides an example operation of the present invention in a partial commit case. As shown in FIG. 6, the transaction in question involves the a message resource placing an update message on an inbound queue 610, the application of business rules to the content of the update message such that the content is stored in a database resource 620, and an update completion message then being placed on an outbound queue 630 by the message resource. In this example it is assumed that the transaction is processed such that the message resource places the message on the inbound queue 610, the database resource 620 is updated, however there is a failure prior to the update completion message being placed on the outbound queue.

As a result of the above failure, the API for the database resource returns a message that the database resource is committed but the API for the message resource indicates that the message resource is not committed and the error condition indicating why the message resource did not commit. Based on this error condition, the recognition engine of the present invention would apply appropriate error resolution and recovery operations before resubmitting the transaction to the message resource. The transaction would not be resubmitted to the database resource.

In resubmitting the transaction to the message resource, the message resource may attempt to place another of the same update message on the inbound queue 610. An error may then result because of the same message being placed on the inbound queue 610. In a known system, this would result in an error condition that would result in a roll back of the changes made by the software resources based on the transaction.

However, the present invention, applying rules from the rules database, may determine that the database 620 is committed and thus, the duplicate message on the inbound queue 610 is not an unrecoverable error and may skip the placing of the duplicate message on the inbound queue 610, the updating of the database 620, and may proceed to the placing of the update completion message on the outbound queue 630. After the update completion message is placed on the outbound queue 630, the message resource API returns a message to the resource integrity engine indicating that the message resource has committed and thus, all of the software resources have committed.

Figure 7:
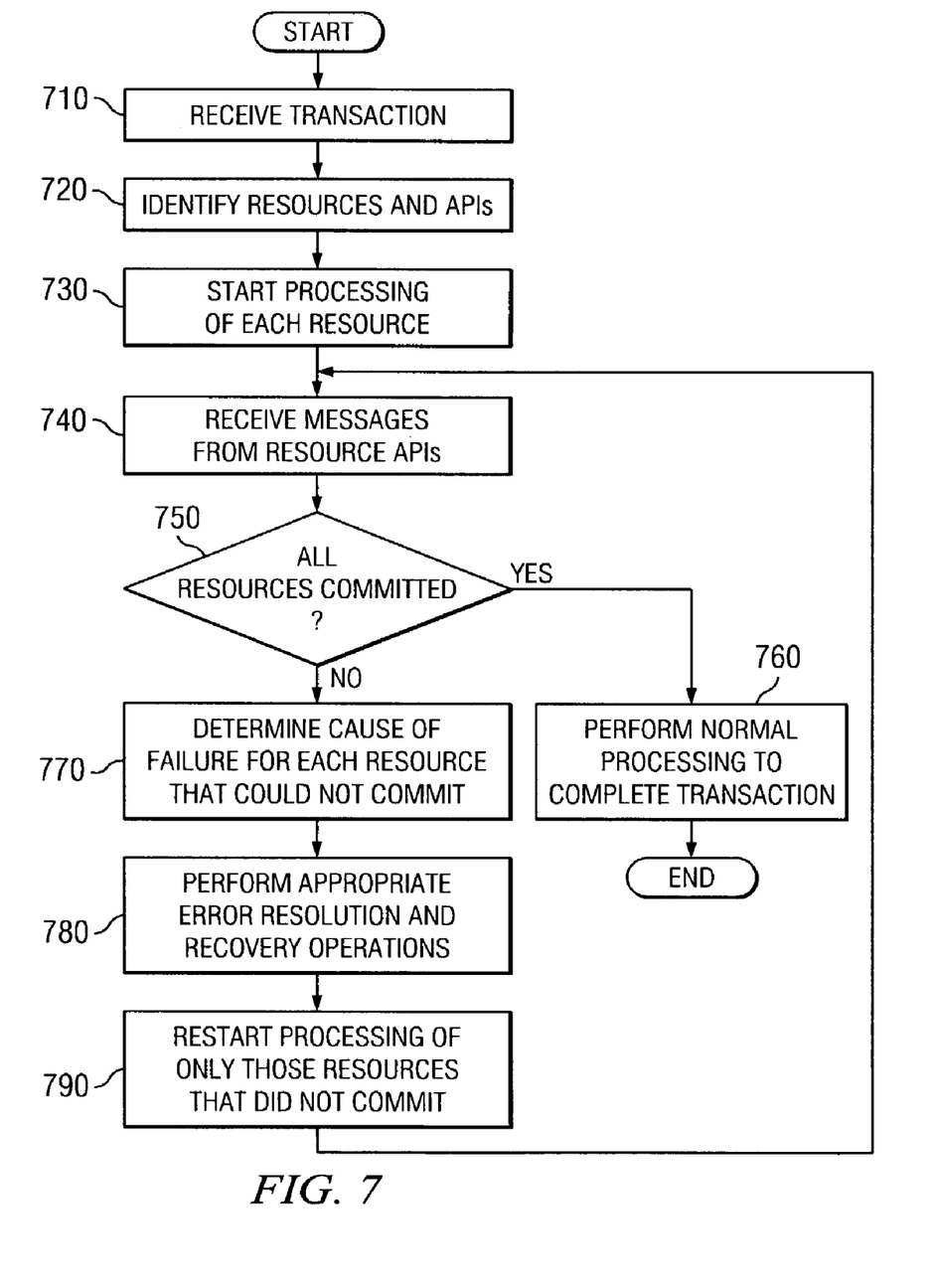
FIG. 7 is a flowchart outlining an exemplary operation of the present invention.

FIG. 7 is a flowchart outlining an exemplary operation of the present invention. As shown in FIG. 7, the operation starts with receiving a transaction (step 710). The individual resources that are part of the transaction are identified based on information contained within the transaction and the APIs registered with the operating system (step 720). The processing of each individual resource that is to participate in the transaction is started (step 730). As each individual resource's processing terminates, messages are received from their associated APIs (step 740). A determination is made as to whether all of the resources have succeeded, i.e. have committed (step 750). If so, normal processing is performed to finish the transaction (step 760). If not, the recognition engine determines the cause of failure for each resource that could not commit (step 770). Appropriate error resolution and recovery operations are performed based on the identified cause of failure (step 780). The processing of only those resources that did not commit is then restarted (step 790) and the operation returns to step 740.

Although not explicitly shown in FIG. 7, and addition step of determining if a predetermined number of resubmission, or restarts, of a resource has been made may be included. In such a case, if the predetermined number of resubmissions has been made, a critical error may be identified and the committed resources may be rolled back. Otherwise, the resubmission may continue until the predetermined number of resubmissions has been made or all of the resources are committed.

Thus, with the present invention, a mechanism is provided for handling transactions in a software environment that does not have a transaction manager. Moreover, the present invention provides a mechanism in which portions of a transaction may be resubmitted to software resources that were unable to commit in order to complete the transaction and avoid rolling back the changes made to committed software resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of processing a transaction in a data processing system comprising:
   receiving the transaction from a client application program executing on another data processing system, wherein the transaction requires use of a plurality of individual software resources to accomplish a task, with each software resource of the individual software resources providing a unique software function that differs from functions provided by other software resources of the individual software resources;
   responsive to receiving the transaction, identifying the individual software resources required to accomplish the task based on information contained within the transaction;
   responsive to identifying the individual software resources, identifying a software resource application programming interface (API) for each of the individual software resources;
   submitting the transaction to a respective API for each of the individual software resources participating in the transaction;
   receiving a response from each of the individual software resources indicating whether the individual software resource was able to commit or was unable to commit; and
   resubmitting a portion of the transaction to an uncommitted resource that was unable to commit, if a response was received from the uncommitted resource indicating the uncommitted resource was unable to commit.

2. The method of claim 1, wherein the response from the individual software resources is one or more response messages received from the application program interfaces associated with the individual software resources.

3. The method of claim 1, wherein if the response from an individual software resource indicates that the individual software resource was unable to commit, the response further includes an identifier of a reason why the individual software resource was unable to commit.

4. The method of claim 3, further comprising:
   applying one or more rules to the response from the individual software resource to determine appropriate error resolution and recovery operations to perform on the individual software resource; and
   performing the error resolution and recovery operations on the individual software resource prior to resubmitting the transaction to the individual software resource.

5. The method of claim 1, further comprising:
   prior to submitting the transaction, generating a transaction state data structure for the transaction; and
   prior to submitting the transaction, populating the transaction state data structure with information about each resource of the plurality of individual software resources that is participating in the transaction.

6. The method of claim 5, further comprising:
   updating the transaction state data structure in response to receiving responses from the individual software resources.

7. A method of processing a transaction in a data processing system comprising:
   submitting the transaction to individual software resources participating in the transaction, wherein the transaction requires use of a plurality of individual software resources to accomplish a task with each resource of the individual software resources providing a unique software function that differs from functions provided by other resources of the individual software resources;
   identifying a software resource application programming interface (API) for each of the individual software resources;
   submitting the transaction to a respective API for each of the individual software resources participating in the transaction;
   receiving a response from the individual software resources indicating whether the software resource was able to commit or was unable to commit; and
   resubmitting a portion of the transaction to an uncommitted individual software resource that was unable to commit, if a response was received from the uncommitted individual software resource indicating the individual software resource was unable to commit, wherein the method is implemented in a software environment where a transaction manager is not present.

8. A method of processing a transaction in a data processing system comprising:
   submitting the transaction to individual software resources participating in the transaction;
   identifying a software resource application programming interface (API) for each of the individual software resources;
   submitting the transaction to a respective API for each of the individual software resources participating in the transaction;
   receiving a response from the individual software resources indicating whether the individual software resources was able to commit or was unable to commit;
   resubmitting a portion of the transaction to an uncommmitted individual software resource that was unable to commit, if a response was received from the uncommitted individual software resource indicating individual software resource was unable to commit;
   determining if a number of resubmissions of a portion of the transaction to the individual software resource exceeds a predetermined threshold, if the response from the individual software resource indicated the individual software resources was unable to commit;
   resubmitting the portion of the transaction to the individual software resource only if the number of resubmissions is less than or equal to the predetermined threshold; and
   transferring control to an error handler if the number of resubmissions is greater than the predetermined threshold, wherein the error handler rolls back changes made by the individual software resources that committed as part of the transaction.

* * * * *